United States Patent
Balkesen et al.

(10) Patent No.: US 10,810,207 B2
(45) Date of Patent: Oct. 20, 2020

(54) LIMITED MEMORY AND STATISTICS RESILIENT HASH JOIN EXECUTION

(71) Applicant: Oracle International Corporation, Redwood Shores, CA (US)

(72) Inventors: Cagri Balkesen, Zurich (CH); Nitin Kunal, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 216 days.

(21) Appl. No.: 15/944,473

(22) Filed: Apr. 3, 2018

(65) Prior Publication Data

US 2019/0303482 A1 Oct. 3, 2019

(51) Int. Cl.
*G06F 16/2455* (2019.01)
*G06F 16/22* (2019.01)

(52) U.S. Cl.
CPC ...... *G06F 16/2456* (2019.01); *G06F 16/2255* (2019.01); *G06F 16/24552* (2019.01); *G06F 16/24554* (2019.01)

(58) Field of Classification Search
CPC ............. G06F 16/2456; G06F 16/2255; G06F 16/24552; G06F 16/24554
See application file for complete search history.

(56) References Cited

U.S. PATENT DOCUMENTS

| 5,287,494 A | 2/1994 | Garcia |
| 5,850,538 A | 12/1998 | Steinman |
| 6,952,696 B1 | 10/2005 | Nadj |
| 9,275,110 B2* | 3/2016 | Pradhan ............... G06F 12/1018 |
| 2012/0011108 A1* | 1/2012 | Bensberg et al. |
| 2016/0275078 A1* | 9/2016 | Attaluri et al. |
| 2017/0255676 A1* | 9/2017 | Attaluri et al. |
| 2018/0004809 A1* | 1/2018 | Ramesh et al. |
| 2018/0211046 A1 | 7/2018 | Muttik |

OTHER PUBLICATIONS

C. Balkesen et al.. "Main-memory hash joins on multi-core CPUs: Tuning to the underlying hardware," 2013 IEEE 29th International Conference on Data Engineering, pp. 362-373.

(Continued)

*Primary Examiner* — Aleksandr Kerzhner
*Assistant Examiner* — Anugeetha Kunjithapatham
(74) *Attorney, Agent, or Firm* — Hickman Palermo Becker Bingham LLP

(57) ABSTRACT

A processor receives a payload array and generates a hash table in a cache that includes a hash bucket array. Each hash bucket element contains an identifier that defines a location of a build key array element in the payload array. For a particular build key array element, the processor determines a hash bucket element that corresponds to the payload array. The processor copies the identifier for particular build key array element into the hash bucket element. If the cache is unable to insert additional build key array elements into the hash table in the cache, then the processor generates a second hash table for the remaining build key array elements in local volatile memory. When probing, the processor probes both hash tables in the cache and local volatile memory for identifiers in hash bucket elements that are used to locate matching build key array elements.

20 Claims, 12 Drawing Sheets

(56) References Cited

OTHER PUBLICATIONS

Begley et al. "MCJoin: A Memory-constrained Join for Column-Store Main-memory Databases", dated 2012, ACM SIGMOD International Conference on Management of Data (SIGMOD '12), pp. 121-132.
Xiaochen et al, "Register Level Sort Algorithm on Multi-core Simd Processors", In Proceedings of the 3rd Workshop on Irregular Applications: Architectures and Algorithms, IA3, dated 2013, 8 pages.
Wegner et al., "The External Heapsort". IEEE Trans. Softw. Eng., dated Jul. 1989. ISSN 0098-5589, 9 pages.
Satish et al., Fast Sort On Cpus, Gpus and Intel Mic Architectures, Intel, 11 pages.
Khuong et al., Heapsort: More Comparisons, Less Memory Traffic, dated Apr. 2014, 34 pages.
J. Chhugani et al., ". Efficient implementation of Sorting on Multi-Core Simd Cpu Architecture", Proc. VLDB Endow., 1(2):1313{1324, datged Aug. 2008. ISSN 2150-8097, 12 pages.
Harada and L. Howes. Introduction to gpu radix sort. Dated 2011, 3 pages.
H. Inoue and K. Taura. "Simd- and Cache-friendly Algorithm for Sorting an Array of Structures", Proc. VLDB Endow., dated Jul. 2015. ISSN 2150-8097, 12 pages.
Gedik et al., Cellsort: High Performance Sorting on the Cell Processor, In Proceedings of the 33rd International Conference on Very Large Data Bases, VLDB '07, VLDB Endowment, 2007, 12 pages.
Fadel et al., ". Heaps and Heapsort on Secondary Storage", Theor. Comput. Sci., 220(2):345-362, dated Jun. 1999. ISSN 0304-3975, 18 pages.
E. Knuth. The Art of Computer Programming, vol. 3: (2Nd Ed.) Sorting and Searching. AddisonWesley Longman Publishing Co., Inc., Redwood City, CA, USA, 1998. ISBN 0-201-89685-0.
Bramas. "Fast Sorting Algorithms Using AVX-512 on Intel Knights Landing" CoRR, abs/1704.08579, 2017a. URL http://arxiv.org/abs/1704.08579, dated 2017, 17 pages.
Bramas. "A Novel Hybrid Quicksort Algorithm Vectorized Using AVX-512 on Intel Skylake", International Journal of Advanced Computer Science and Applications (IJACSA), Nov. 2017, 9 pages.
Balkesen, U.S. Appl. No. 15/852,038, filed Dec. 22, 2017, Notice of Allowance, dated Nov. 5, 2019.
Idicula, U.S. Appl. No. 15/882,108, filed Jan. 29, 2018, Office Action dated Dec. 28, 2018.
Xu et al., "A Flight Data Recorder for Enabling Full-system Multiprocessor Deterministic Replay", 30th Annual International Symposium on Computer Architecture San Diego, CA, Jun. 2003, 12 pgs.
Staats et al., "Parallel Symbolic Execution for Structural Test Generation", ISSTA'10, Jul. 12-16, 2010, Trento, Italy, 11 pages.
Sorin, "SafetyNet: Improving the Availability of Shared Memory Multiprocessors with Global Checkpoint/Recovery", dated May 2002, 14 pages.
Sheehy, Justin, "Why Vector Clocks Are Hard", Basho Blog, dated Apr. 5, 2010, 14 pages.
Roy et al., "Hybrid Binary Rewriting for Memory Access Instrumentation", VEE'11, Mar. 9-11, 2011, Newport Beach, California, USA, 12 pages.
Luk, et al., "Pin: Building Customized Program Analysis Tools with Dynamic Instrumentation", PLDI'05 Jun. 12-15, 2005,Chicago,Illinois,USA, 11 pages.
Liu et al., "ad-heap: an Efficient Heap Data Structure for Asymmetric Multicore Processors", In Proceedings of Workshop on General Purpose Processing Using GPUs, ACM, dated 2014, 10 pages.
LeGendre, Matthew, "Dyninst as a Binary Rewriter", dated Apr. 2008, 23 pages.
LaMarca et al., "The Influence of Caches on the Performance of Heaps", dated Jan. 1, 1996, 26 pages.
Graham, "gprof: a Call Graph Execution Profiler" dated 1982, 10 pages.
Furtak et al., "Using SIMD Registers and Instructions to Enable Instruction-Level Parallelism in Sorting Algorithms", ACM Symposium on Parallel Algorithms and Architectures, dated 2007, 10 pages.
D.E. Knuth, "The Art of Computer Programming", vol. 3: 2nd Edition Sorting and Searching, ISBN: 0-201-03803-X, pp. 129-157 from book, dated 1973.
Bach et al., "Analyzing Parallel Programs with Pin", Computer, Published by the IEEE Computer Society, dated 2010, 8 pages.
"Linux/UNIX System Programming Training", dated Aug. 14, 2107, 12 pages, http://man7.org/linux/man-pages/man1/gcov.1.html.
Zhou et al., "Implementing Database Operations Using SIMD Instructions", Proceedings of the ACM Sigmod International Conference on Management of Data, dated Jun. 3, 2002, pp. 145-156.
Liu et al., "Ad-Heap", General Purpose Processing Using GPUS, ACM, 2 Penn Plaza 701 New Yorkm NY, USA, dated Mar. 1, 2014, pp. 54-63.
Tridgell et al., "A General-Purpose Paralll Sorting Algorithm", Computer Sciences Laboratory Australian National University, dated 1993, 24 pages.
Hunt et al., "An Efficient Algorithm for Concurrent Priority Queue Heaps", dated 1996, 7 pages.
Futak et al., "Using SIMD Registers and Instructions to Enable Instruction-level Parallelism in Sorting Algorithms", ACM Symposium on Paralleslism in Algorithms and Architectures dated 2007, 10 pgs.
Deo et al., "Parallel Heap: An optimal Parallel Priority Queue", dated 1992, 12 pages.

\* cited by examiner

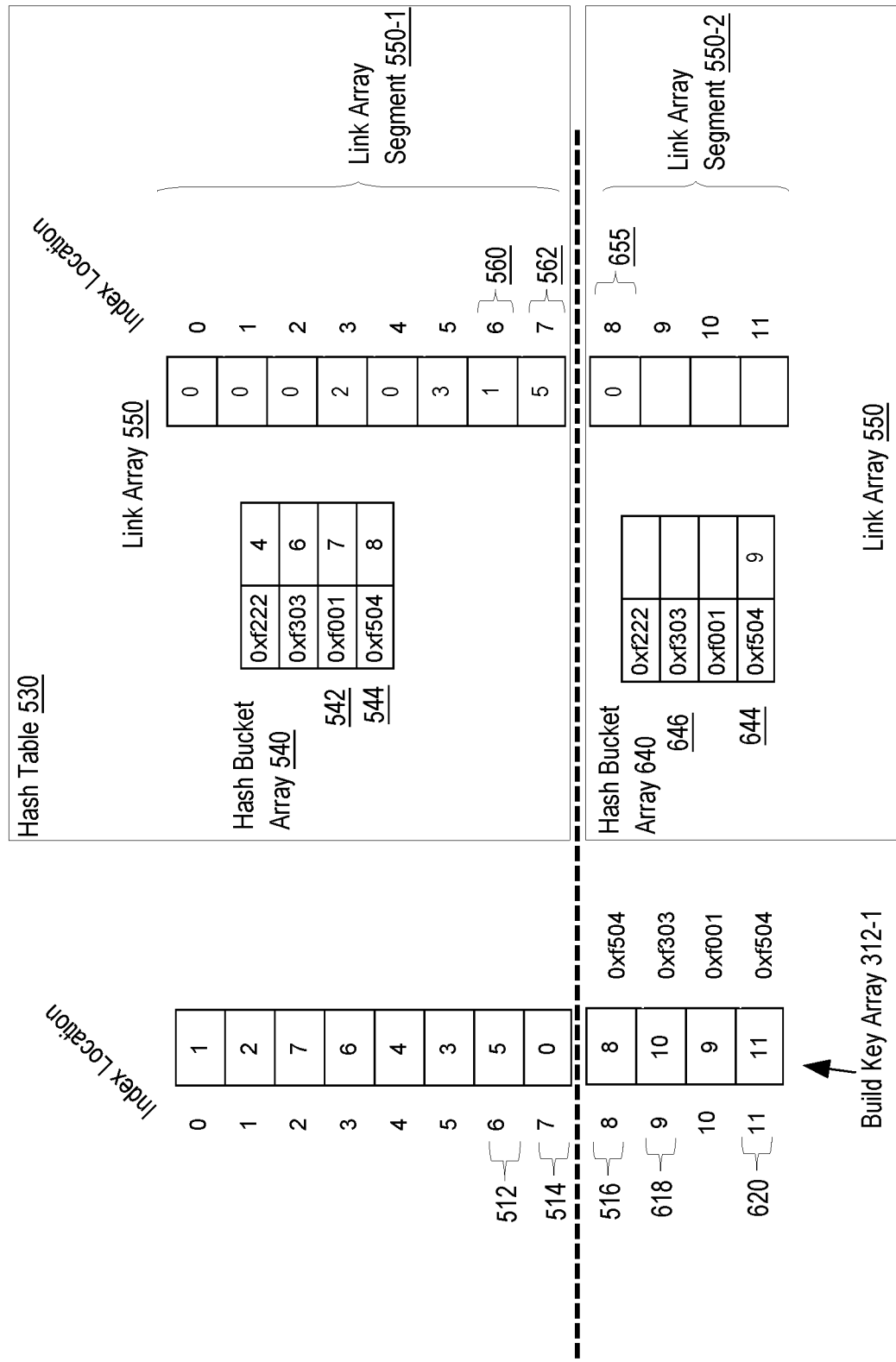

LIMITED MEMORY AND STATISTICS RESILIENT HASH JOIN EXECUTION

CROSS-REFERENCE TO RELATED APPLICATIONS; BENEFIT CLAIM

This application is related to application Ser. No. 15/852,038, filed on Dec. 22, 2017, entitled "Partitioning-Based Vectorized Hash Joins with Compact Storage Footprint", by Cagri Balkesen et al., the entire content of which is hereby incorporated by reference.

FIELD OF THE INVENTION

The present invention relates to query processing techniques, and more specifically, to computer-implemented techniques for memory and database statistics resilient partition-based hash joins.

BACKGROUND

Database servers commonly receive commands that require the performance of a class of operations known as "join operations." A join operation is used to combine multiple tables, so that data from those tables may be selected in a query. A query that joins two tables may specify how the tables are joined using join criteria. A join operation comprises merging each row in a first table with each row of a second table that matches the join criteria. For example, a query may specify that rows in the first table only join with rows in a second table when rows in the first table have a value in a particular column that equals the value in a particular column of rows in the second table. The corresponding columns that contain the values that determine which rows of the first table join with which rows of the second table are referred to as the "join keys."

Database servers may rely on an algorithm known as a "hash join" to efficiently perform join operations. The "hash join" operation typically comprises two phases. In the first phase, known as the "build phase," the database server generates a hash table by hashing each row of the build table according to a hash function on the join key. In the second phase, known as the "probe phase," the database server iteratively scans through each row of the second table, referred to herein as the probe table. For each row in the probe table, the database server uses the hash function and the hash table to identify rows in the build table with equal join key values. When matching rows with equal join key values are identified, the rows are merged and added to the result set for the join operation.

Partitioned hash join techniques rely on an initial hash partitioning of input relations for fully cache resident execution. During the partition phase, the database server partitions the input relations into sizes configured to fit in lower level caches. By ensuring that the entire partition fits into the cache of a node, execution of the build and probe phase become much more efficient because cache misses are eliminated. Database servers determine partition size based on database table statistics. Table statistics refer to statistical information about the distribution of values in one or more columns of a table or index and/or the total number of rows (i.e., cardinality) in a table.

However, problems may arise when determining partition sizes based on inaccurate or incomplete table statistics. For example, intermediate tables may not have complete or accurate table statistics and as a result, partitions created based on inaccurate table statistics may result in partition size skew, that is, partitions that are more uneven in size than expected with some partitions being much larger than expected. As a consequence, larger than expected partitions may not fully fit into lower level caches, and, in turn, the build and probes phases cannot be free of cache misses. One such solution to partitions size skew is to perform subsequent partitions of the larger than expected partition groups. For example, larger partitions are further partitioned into smaller partition sizes until the partitions are able to fit within the cache. However, this technique may involve additional rounds of the partitioning phase. Therefore, there is a need for efficiently partitioning database tables within a single round of partitioning and building subsequent hash tables without incurring multiple cache misses.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 6A and 6B depict an example of two hash tables containing different portions of build key array elements of a build key array at various stages in a spillover phase.

DETAILED DESCRIPTION

Figure 1:
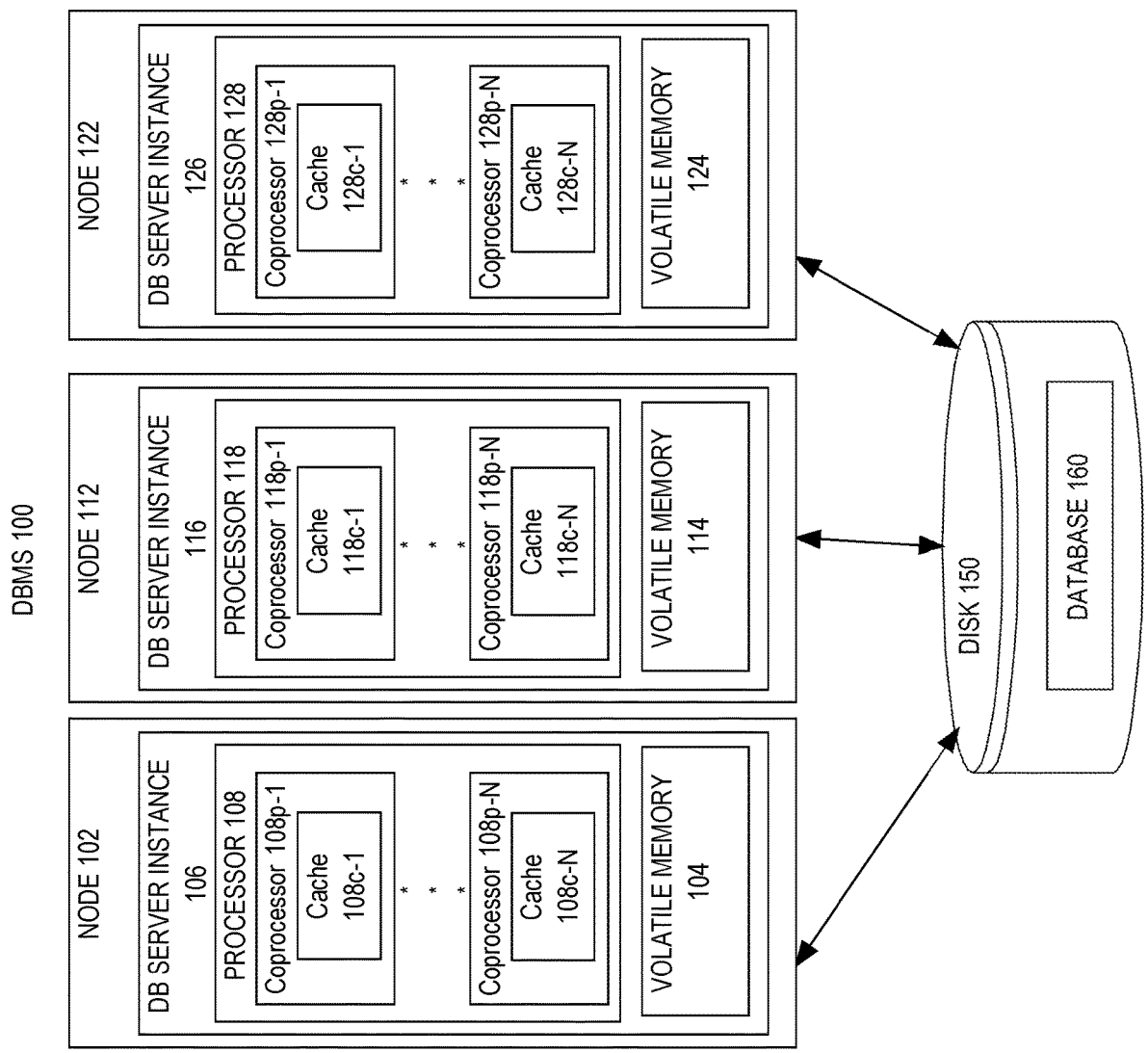
FIG. 1 is a block diagram illustrating a system architecture of a multi-node database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for generating a hash table structured to enable more efficient probing during a join operation and to minimize memory storage requirements.

Because memory storage requirements are minimized, the memory storage footprint of the hash table within a cache is smaller.

An advantage of the techniques described herein is that cache containment of a hash join operation is achieved for larger subsets of data. Cache containment is achieved when memory accesses that are performed for a hash join operation on a subset of a body data are limited to a cache used to store the subset of data. The term cache refers to an area of memory that is used to temporarily store a portion of a body data to stage the portion for quicker access to perform an operation, such as a hash join, where the body of data, including at least a version of the staged portion, is also stored in slower-to-access higher latency memory. The operation may entail generating interim data in the cache that will not be stored in the slower-to-access higher latency memory. An example of a cache is a memory area within a SRAM (static random access memory) CPU memory that temporarily stores a portion of data from a DRAM (dynamic random access memory) main memory that is coupled to the CPU. When cache containment for the portion of data is achieved for a hash join operation, higher latency accesses to DRAM main memory are avoided.

Because the memory footprint of the hash table is smaller, a hash join operation may be performed on a larger amount of data while achieving cache containment. This means a body of data may be split into a smaller number of partitions that are larger but may nevertheless be processed with cache containment. Processing a lesser number of partitions also enables more efficient parallel processing for a given number of processing cores.

As mentioned previously, partition size skew may lead to larger partition sizes than expected. For such larger partitions, full cache containment may not be achieved, which results in cache spillover. Cache spillover occurs when memory accesses are made outside the cache.

Techniques described herein for generating a hash table structure handle cache spillover conditions for larger partitions while retaining full cache containment for other partitions. Even for partitions for which cache spill over is encountered, cache containment is maximized because some memory accesses are limited to cache. Finally, other more expensive techniques for handling cache spill over, such as repartitioning larger partitions, can be avoided.

In an embodiment, a computing node stores a partition of a body data, the partition comprising a build key array. Each build key array element of the build key array holds a join key value from a build table. A hash table is generated and comprises two arrays: a hash bucket array and a link array. Each element of the hash bucket array corresponds to a single hash bucket and is referred to herein as a hash bucket element. A link array comprises link array elements and is index aligned with the build key array. The hash bucket and link array together identify "hash bucket chains" of elements in the build key array that belong to hash buckets. A particular hash bucket element corresponds to a particular chain. A hash bucket chain may be referred to herein as a chain, and the build key array elements in a hash bucket chain are referred to as members of the chain or hash bucket chain.

A hash bucket element itself identifies an offset of a member build key array element in the hash bucket chain. The term offset value is used herein to refer to a value from which an ordinal position of an array element ("index") within an array may be derived. For example, index values may be derived from an offset value by subtracting 1.

As the build key array and link array are aligned, the offset in the hash bucket element to the build key array element also identifies a corresponding link array element. This corresponding link array element may hold another offset that identifies both another build key array element that is a member in the chain and a preceding link array element, which in turn, may hold another offset to a member and preceding link array and so forth. In effect, the build key array elements that hold join key values of a hash bucket chain are identified by a hash bucket element and a series of link array elements pointed to by the hash bucket element, the series being interlinked by offset values in the link array elements.

For some partitions, there may not be enough memory in the cache to completely store a hash table. In this situation, lower latency memory, such as DRAM, is used to store spillover arrays for the hash table. The spillover arrays include a spillover hash table array and a spillover link array segment. The hash table array stored in the cache may be referred to herein after as the in-cache hash table array. The segment of the link array stored in the cache may be referred to herein as the in-cache link array segment. The logical concatenation of the in-cache link array segment and spillover link array segment form the link array and are together index aligned with the build key array.

Like the in-cache hash table array, each element in the spillover hash bucket array corresponds to a single hash bucket element. Unlike the in-cache hash bucket array, a hash bucket element in the spillover hash table array may hold an offset that identifies a link array element in the spillover link array segment.

System Overview

FIG. 1 depicts a multi-node database system on which an embodiment may be implemented. In the embodiment illustrated in FIG. 1, DBMS 100 comprises three nodes, 102, 112, and 122. Although three nodes are shown in the present illustration, in other embodiments, DBMS 100 may comprise fewer or more nodes.

Each of nodes 102, 112, and 122 have access to the same database 160. For the purpose of illustration, database 160 is shown as stored on a single shared disk 150, but in alternative embodiments may be spread across multiple disks to which each of nodes 102, 112, and 122 have access.

According to an embodiment, each of nodes 102, 112, and 122 includes a multi-core processor that comprises multiple co-processors on the same chip. Nodes 102, 112, 122 comprise multi-core processors 108, 118, and 128, and main volatile memory 104, 114, and 124. Main volatile memory 104, 114, and 124 are connected to processors 108, 118, and 128 via a bus (not shown).

Processor 108 comprises coprocessor 108p-1 through 108p-N. Each of these coprocessors comprises separate circuitry on the same chip, and is connected to a local cache that is not accessible to other co-processors 108p. Coprocessor 108p-1 is connected to local cache 108c-1 and coprocessor 108p-N is connected to local cache 108c-N. In an embodiment, a local cache may comprise scratchpad memory. Scratchpad memory may refer to a fast-access memory that is electronically coupled to a coprocessor. Scratchpad memory may comprise SRAM.

Processor 118 comprises processor 118p-1 through 118p-N. Processor 118p-1 is connected to local cache 118c-1, and processor 118p-N is connected to local cache 118c-N. Processor 128 comprises processor 128p-1 through 128p-N. Processor 128p-1 is connected to local cache 128c-1, and processor 128p-N is connected to local cache 128c-N.

In an embodiment, nodes 102, 112, and 122 respectively execute database server instances 106, 116, and 126. While in the illustrated embodiment each node is executing a single database server instance, in alternative embodiments, a single node may execute more than one database server instance.

Both caches 109c, 118c, and 128c and main volatile memory 104, 114, and 124 are examples of addressable memory. Addressable memory is memory which can be referenced, such as by referring to a register storing a particular memory address, by a software instruction that causes a processor to load data from the memory at the particular memory address to a register or to store data from a register to a particular memory address.

Use of scratchpad memory provides advantages. Like a L1 cache, scratchpad memory is positioned close to processor registers and enables rapid retrieval of small amounts of data that are temporarily stored. For example, scratchpad memory may store temporary results generated mid-computation by a processor. Unlike a L1 cache, however, data stored in scratchpad memory is not always intended to be copied into main volatile memory. Furthermore, typical cache management of L1 cache is under the control of hardware and cannot be addressed by processor software instructions. In contrast, management of scratchpad memory may be controlled by a programmer via software instructions that address memory locations in scratchpad memory.

Hash Join

A database query may include a join operation. A query optimizer is configured to parse the query and determine tables involved in the join operation. The query optimizer may then determine to perform the join operation using a hash join. As mentioned before, a hash join algorithm involves multiple phases including, but not limited to, a partition phase, a build phase, and a probe phase. During the partition phase, the database system may partition one or more tables that are part of the join operation. Each partition includes a build key array and probe key array and may include one or more payload arrays that each contain column values of a column not involved in the join condition from the build table or probe table. By partitioning large tables into partitions, each partition may be allocated and processed by a coprocessor such that the partition may be fully loaded into cache. Loading the entire partition into a coprocessor's cache increases cache containment.

During the build phase, the coprocessor constructs a hash table based on a build key array of a partition. The coprocessor builds the hash table by scanning the build key array elements and hashing the build key array elements based on the join keys.

During the probe phase, the coprocessor scans probe key array elements from a probe key array. The coprocessor hashes each probe key array element of the probe key array to identify the hash bucket element identifying the chain of build key elements corresponding to the probe key array element. Then the coprocessor compares the probe key element to each build key array element in the chain to determine whether the probe key array element and the build key array element match. Rows corresponding to each matching probe key array element and build key array element are then used to create a result set of joined values.

Figure 2:
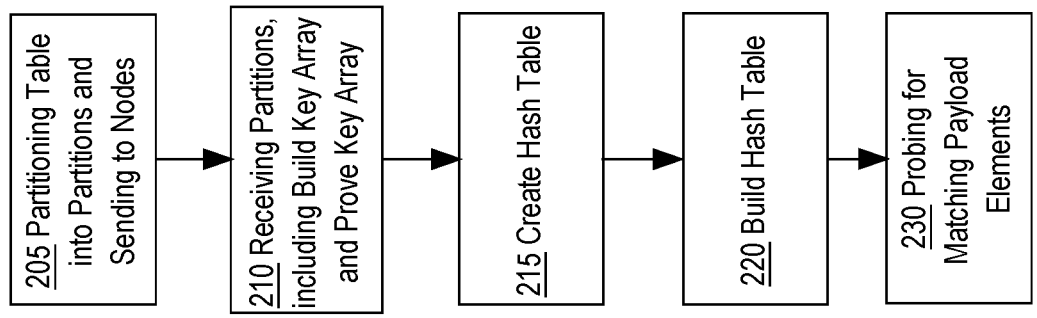
FIG. 2 is an example flowchart illustrating a database system performing steps of a hash join by partitioning a table, building a hash table, and probing the hash table for matching entries.

FIG. 2 depicts a flowchart illustrating the steps performed by a database system to perform partition-based hash joining, according to an embodiment.

Partition Phase

Referring to FIG. 2, at step 205, DBMS 100 uses a query optimizer to parse the query and determine tables that are part of the join operation and then partitions the tables involved in the join operation into partitions. The partitions are sent to nodes 102, 112, and 122. For example, the join operation may include tables R and S and DBMS 100 may partition table R into partitions for the build phase. In an embodiment, DBMS 100 determines the number and size of the partitions based upon the size of the table, the number of available nodes for processing, and the sizes of the local caches on available nodes, e.g., sizes of local caches 108c-1-108c-N. Partitioning enables the ability for independent parallelism by assigning partitions to multiple nodes where coprocessors are able to work on a different partition independently in a parallel environment.

Additionally, the relatively smaller footprint of the hash table means that the partitions into which the tables are partitioned may be larger, i.e., contain more data or larger portion of rows of tables involved in the hash join. Thus, larger partitions may be configured to fit within the caches of each of nodes 102, 112, and 122 respectively. If each partition is able to fit within the cache of each respective node 102, 112, and 122, then the build and probe phases may be able to be performed with cache containment.

In an embodiment, DBMS 100 determines the number of coprocessors of nodes 102, 112, and 122 that are available for processing the hash join. DBMS 100 then determines the sizes of the caches of the available coprocessors. Available cache size may be based upon determining the size of the hash table data structures that need to be generated for the hash join. By sizing the partition based upon the available cache memory, DBMS 100 is able to ensure that the partition fits within the available cache within node 102 in a way that ensures cache containment. In an embodiment, DBMS 100 estimates the partition sizes of the table using database table statistics provided by the DBMS. Database table statistics refers to statistical information about the distribution of values in one or more columns of a table. DBMS 100 may be able to use database table statistics to estimate the cardinality, and the relative size of a group of rows within a table. By using the database table statistics, DBMS 100 may be able to estimate the size of partitions of a table for the purpose of estimating the size of a hash table build. If a particular partition received by any of coprocessors of processors 108, 118, and 128 is too large to entirely fit within the cache, then the hash table may be spilled over into main memory.

Figure 3:
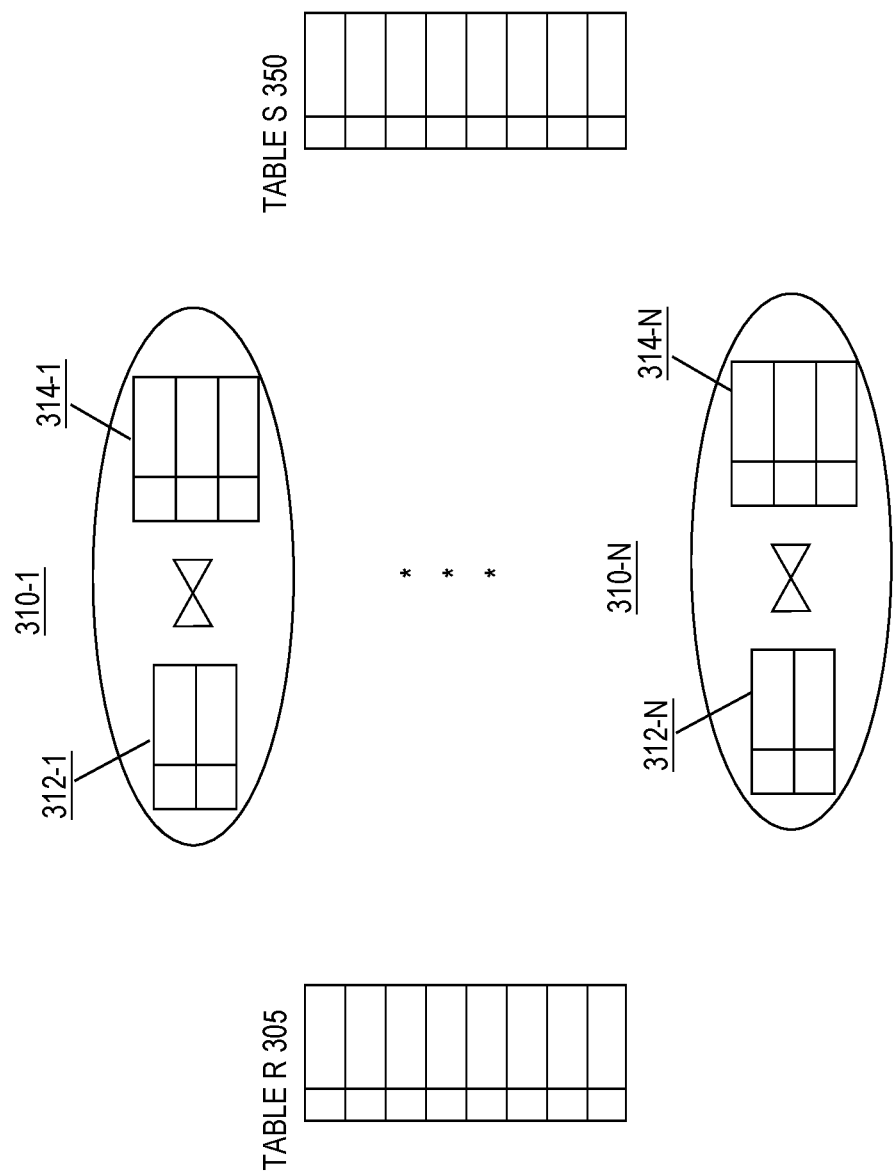
FIG. 3 depicts an example embodiment of phases of a hash join technique.

FIG. 3 depicts an example of the phases of the hash join technique where table R 305 and Table S 350 are partitioned and processed in parallel by multiple coprocessors of processors 108, 118, and 128 on nodes 102, 112, and 122, respectively. In an embodiment, Table R 305 and Table S 350 represent tables that are a target of the join operation. At step 205, DBMS 100 partitions Table R 305 and Table S 350 into multiple partitions 310-1 through 310-N. Each of partitions 310-1 through 310-N includes a build key array containing join key values from Table R 305 and a probe key array containing join key values from Table S 350. Partition 310-1 includes build key array 312-1 and probe key array 314-1, and partition 310-N includes build key array 312-N and probe key array 314-N.

Build Phase

Referring to FIG. 2, at step 210, each of nodes 102, 112, and 122 receive partitions and store each of the received partitions within their respective main memory. Each of the partitions that is stored in main memory of nodes 102, 112, and 122 are loaded into a local cache of a coprocessor of processors 108, 118, and 128, respectively. Each coprocessor performs a hash join for a partition loaded into the local cache of the coprocessor.

Steps 215-230 describe steps for performing a hash join, and in particular, for generating a hash table, populating the hash table, and probing the hash table for join key values that match the join condition. Each of the steps is performed, in parallel by a coprocessor of each of nodes 102, 112, and 122. For the purposes of exposition, steps 215-230 are described in terms of execution by coprocessor 108*p*-1 of node 102. Coprocessor 108*p*-1 is performing a hash join on a partition 312-1, which has been loaded into cache 108*c*-1.

At step 215, coprocessor 108*p*-1 generates and initializes a hash table within cache 108*c*-1.

Figure 4:
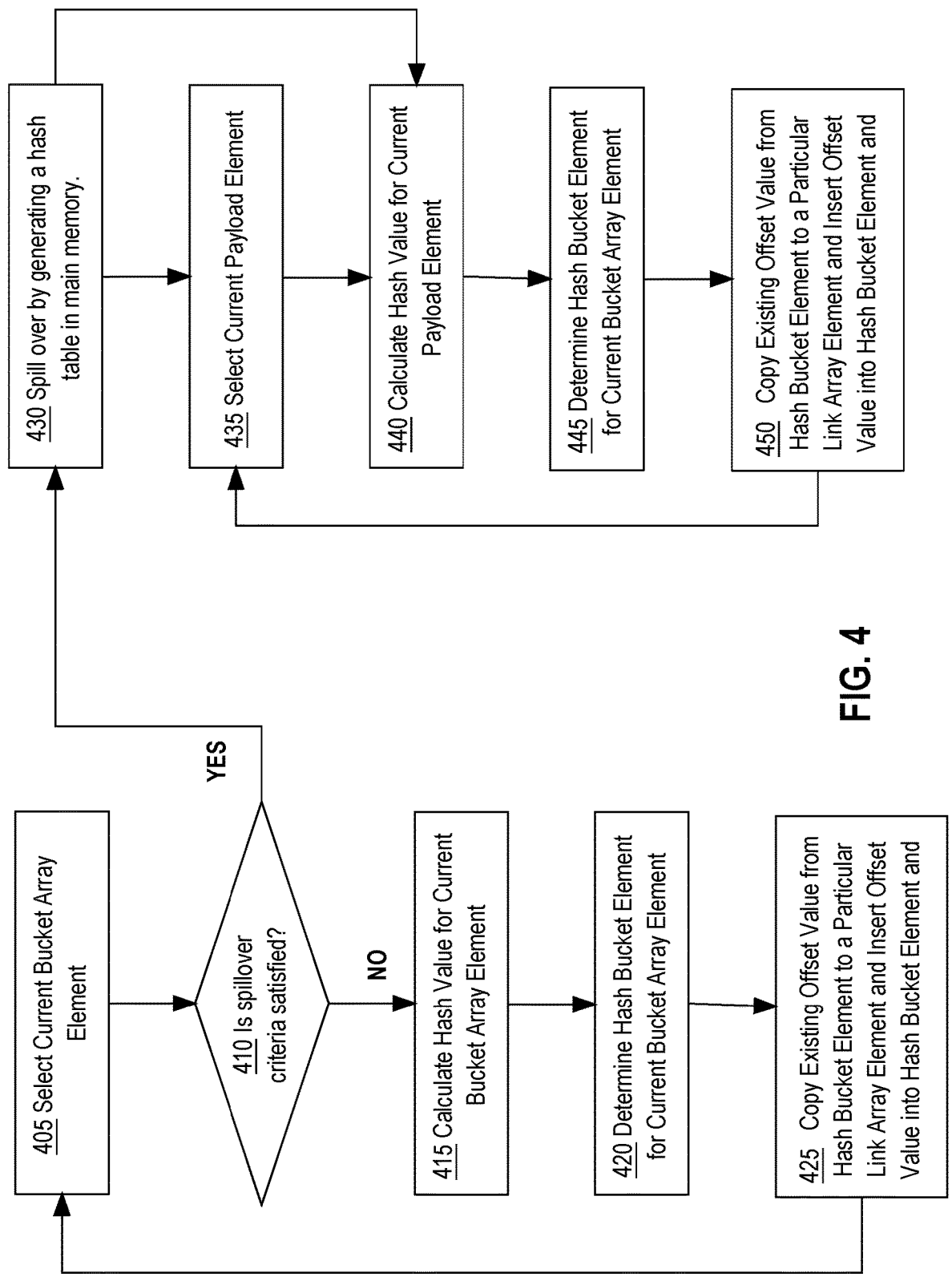
FIG. 4 depicts an example flowchart for calculating hash values for build key array elements and loading build key array elements into a hash bucket array and a link array.

At step 220, the coprocessor 108*p*-1 builds the hash table. A procedure for building a hash table is depicted in FIG. 4.

At step 230, the hash table is probed to determine matching join key values.

Hash Table Structure

Figure 5A:
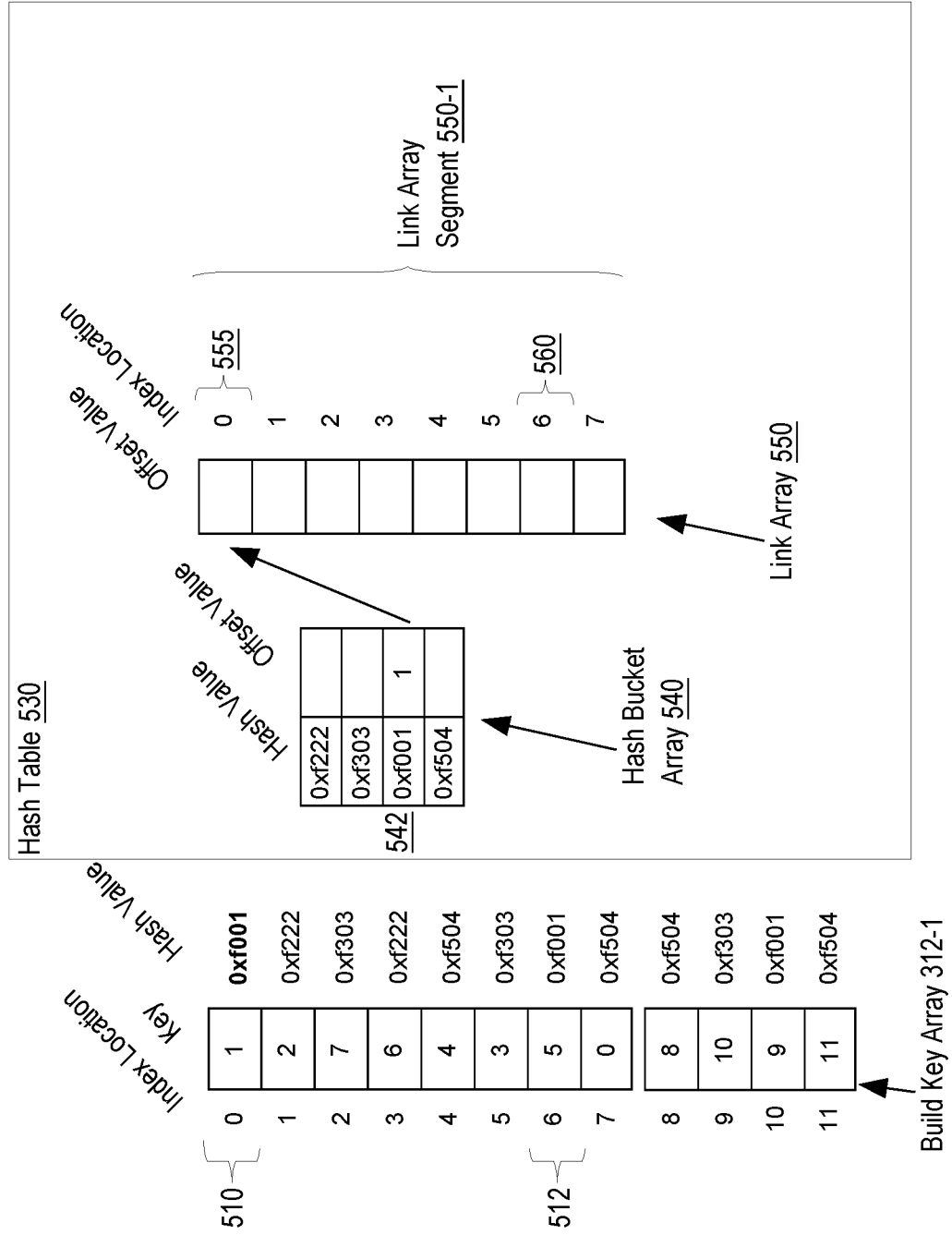
FIGS. 5A, 5B, and 5C each depict different stages of loading offset values for build key array elements into the hash table, including loading offset values into a bucket array and a link array.
Figure 5B:
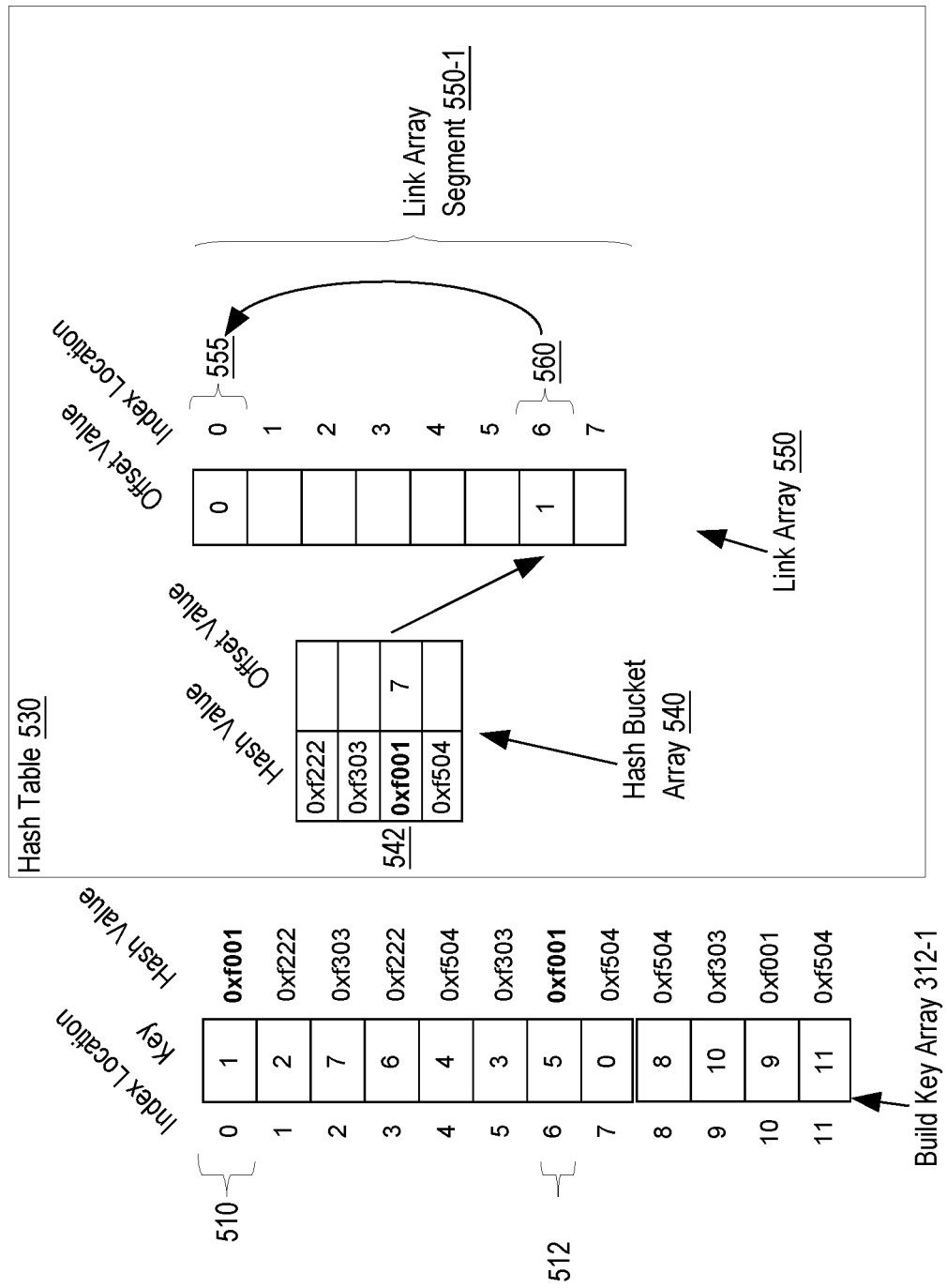
Figure 5C:
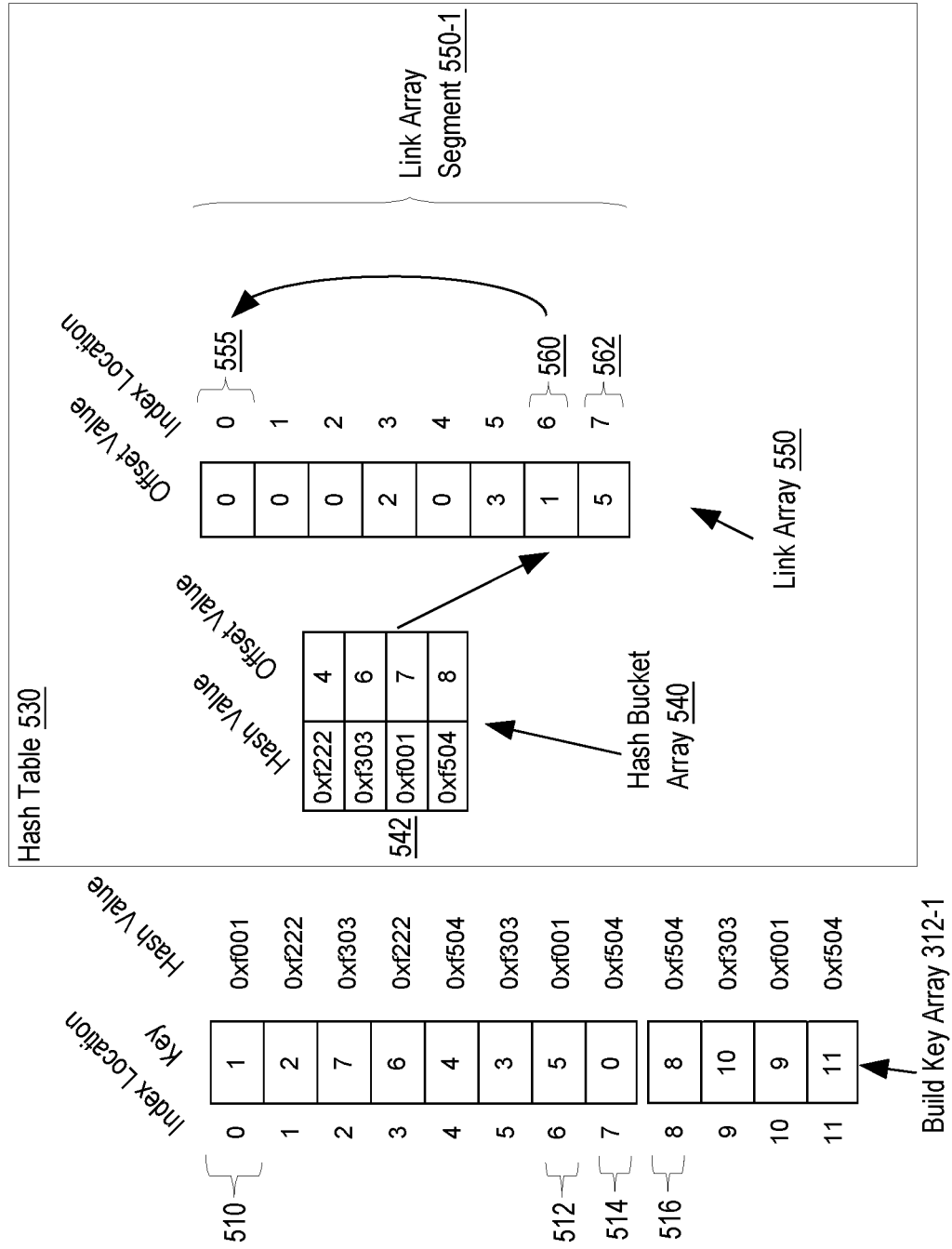
Figure 6B:
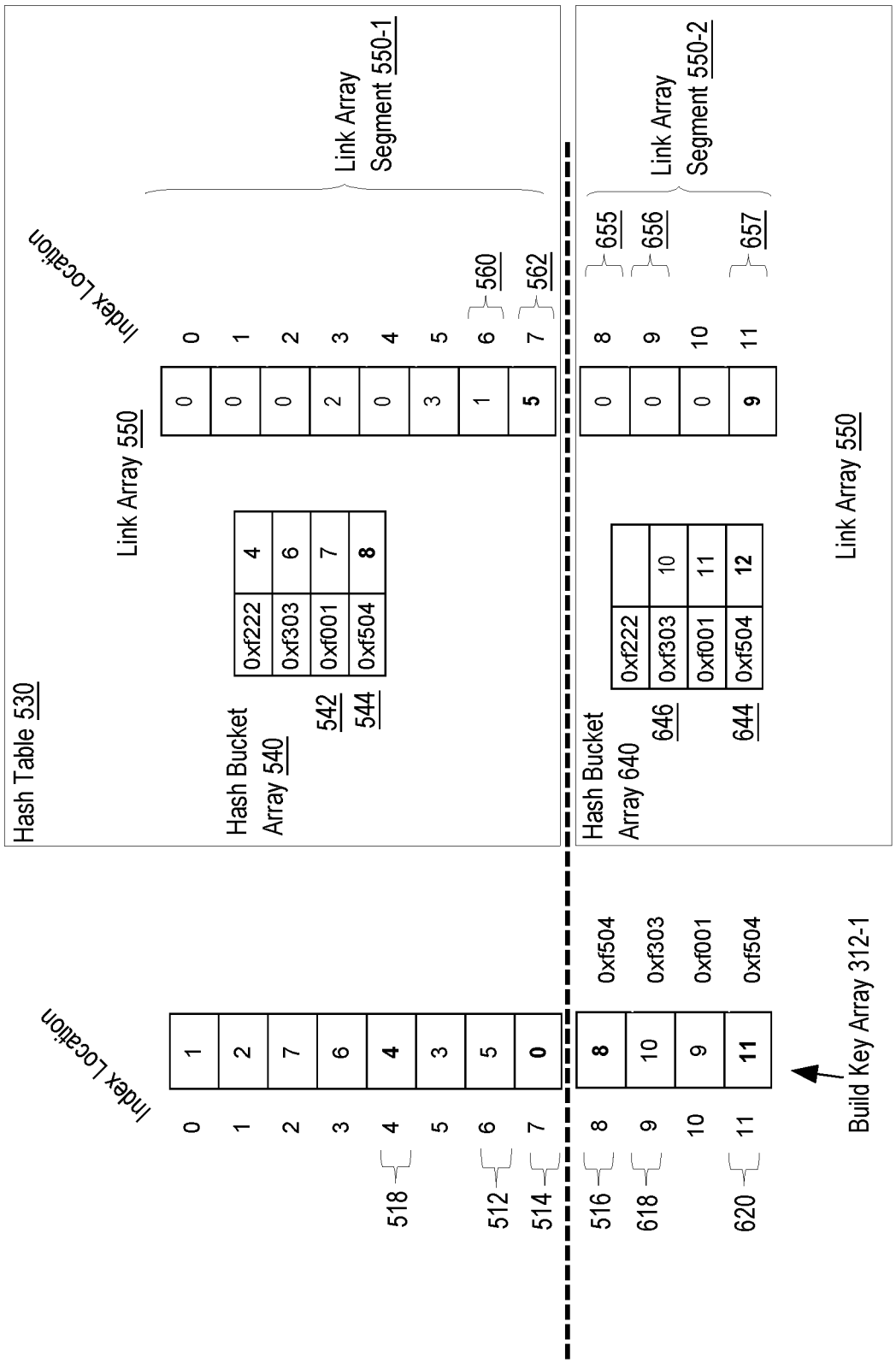

The procedure for building a hash table is illustrated using the versions of the hash table depicted in FIGS. 5A, 5B, 5C, 6A, and 6B, each of which depicts a hash table 530 at various stages in building hash table 530. FIGS. 5A, 5B, 5C depict the hash table before spillover, while FIGS. 6A and 6B depict the hash table after spillover.

Even though FIG. 5C depicts hash table 530 at a stage later than creation and initialization, FIG. 5C is useful for illustrating the creation and structure of hash table 530. Referring to FIG. 5C, it depicts hash table 530 and build key array 312-1. Hash table 530 comprises hash bucket array 540 and link array 550. Hash bucket array 540 is an in-cache hash bucket array.

Build key array 312-1 comprises 12 elements, each holding a join key value and each being associated with an ordinal index position. Build key array element 510 is at index position 0 and holds join key value 1; build key element 512 is at index position 6 and holds join key value 5.

Hash bucket array 540 comprises hash bucket elements. Each hash bucket element corresponds to a hash value that is calculated using a hash function. The first hash bucket corresponds to hash value "0xf222". When hash table 530 is built, elements from the build key array are assigned to hash bucket elements based on a hash value calculated for the build key array element.

Link array 550 comprises several link array segments. One link array segment is in-cache link array segment 550-1. Another is spillover link array segment 550-2, which is not depicted in the FIG. 5C but is depicted in FIGS. 6A and 6B. Link array 550 is in effect a logical concatenation of link array segment 550-1 and link array segment 550-2, with link array segment 550-1 being first in the concatenation.

Link array 550 is indexed aligned with build key array 312-1. As such, build key array element 510 and link array element 555 are at index position 0 and build key array element 512 and link array element 560 are at index position 6.

In an embodiment, the hash bucket elements in the hash bucket array are configured to store an offset value that identifies an index position of both a build key array element and link array element. The offset value identifying a build key array element may be calculated based on the index position value of the build key array element. In the embodiment, the offset value equals "index position value+1". For example, hash bucket element 542 holds the offset value 7, which corresponds to index position 6, thereby identifying build key array element 512 and link array element 560.

Link array element 560 holds the offset value 1, which corresponds to index position 0, thereby identifying build key array element 510 and link array element 555.

In an embodiment, coprocessor 108*p*-1 may configure the datatype of the offset value to equal a datatype small enough to reduce the footprint of the hash table, yet large enough to cover the size build key array. For example, either 1-byte, 2-byte, or 4-byte integers may be used as the offset value.

For example, hash bucket array element 542 represents a chain of a hash bucket. The first member of the chain is identified by the offset value 7, which is build key array element 512 at index position 6 in build key array 312-1. The offset value 7 also identifies link array element 560, which contains offset value 1. Offset value 1 identifies another member of the chain, build key array element 510 at index position 0. Offset value 1, in turn, identifies link array element 555, which holds the offset value 0. The offset value 0 represents that there are no more members in the chain.

By calculating the offset values as the "index value+1", an offset value of 0 may be used to indicate that there are no build key array elements or no further build key array elements in a chain. Offset values that are greater than or equal to 1 indicate a build key array element that has a matching hash value. In other embodiments, the offset value may represent a value that equals or is based on an index value. For example, the offset value may equal the index value plus two, three, or any other value.

Hash Table Build

FIG. 4 depicts a flowchart of a procedure for generating an in-cache and spill over structures of a hash table. The procedure involves performing steps in multiple iterations of a loop. The procedure is illustrated using hash table structures generated in local cache 108*c*-1 that are illustrated in FIGS. 5A, 5B, and 5C, and FIGS. 6A and 6B. These figures each represent a different stage of generating and populating the hash table data structure.

At step 405, coprocessor 108*p*-1 selects a build key array element from the build key array 312-1. In an initial iteration, coprocessor 108*p*-1 selects the build key array element at index location 0 within the build key array 312-1 (see FIG. 5A), which is build key array element 510.

At step 410, coprocessor 108*p*-1 determines whether one or more spillover criteria is satisfied. If one or more spillover criteria is satisfied, then hash table 530 is spilled over into main volatile memory 104 at 430, as shall be described in further detail. At this point in the illustration, at step 410 it is determined that spillover criteria is not satisfied. Thus, coprocessor 108*p*-1 proceeds to step 415.

At step 415, coprocessor 108*p*-1 calculates a hash value for the selected build key array element. For example, coprocessor 108*p*-1 calculates the hash value for build key array element 510 to be "0xf001."

At step 420, coprocessor 108*p*-1 determines the particular hash bucket element that corresponds to the calculated hash value. Hash bucket element 542, of hash bucket array 540, corresponds to hash value of "0xf001."

At 425, coprocessor 108*p*-1 copies the existing offset value stored in hash bucket element 542, if any, to the link array element, in link array 550, that corresponds to the aligned index position of the build key array element 510. When hash bucket element 542 does not have an existing offset value, or, for example, the existing offset value is set to zero, then coprocessor 108*p*-1 sets the offset value of link array element 555 to 0, or may omit the step of copying the offset value from the hash bucket element 542 to link array element 555.

Coprocessor 108p-1 also inserts an offset value calculated for the selected element into the particular hash bucket element that is assigned the matching hash value. In an embodiment, the offset value is based on the index position of the currently selected build key array element, which in this illustration is build key array element 510. The offset value may be a value that is calculated as the value of the index position of the element 510 plus 1, which in this example is (0+1=1). Coprocessor 108p-1 then inserts the offset value for element 510 into hash bucket element 542.

Coprocessor 108p-1 returns to step 405 and iterates through additional build key array elements.

FIG. 5B depicts an example of loading build key array element 512 into the hash bucket array where the hash bucket element 542 already contains the loaded offset value from build key array element 510. At step 405, coprocessor 108p-1 selects build key array element 512 from build key array 312-1. At step 415, coprocessor 108p-1 calculates the hash value for build key array element 512 as "0xf001." Then at step 420, coprocessor 108p-1 determines that hash bucket element 542 is assigned the hash value "0xf001", and then at 425 coprocessor 108p-1 then copies the current offset value from hash bucket element 542, which is the offset value associated with build key array element 510, to the link array element 560. Link array element 560 is located at link array index position "6" which is index aligned to the build key array index position for the selected build key array element 512. After coprocessor 108p-1 performs the copy operation, link array element 560 contains the offset value "1" which is associated with the previously loaded build key array element 510 that has the same calculated hash value of "0xf001." Coprocessor 108p-1 inserts the calculated offset value for the build key array element 512 into hash bucket element 542. Referring back to FIG. 5B, the generated offset value for build key array element 512 is "7," which is calculated as the build key array index position of build key array element 512, (6+1=7).

Coprocessor 108p-1 then proceeds to step 405 to select the next build key array element. FIG. 5C represents an example embodiment of hash table 530 containing offset values for the build key array elements from build key array 312-1 after being populated with build key array element 514.

At step 405, coprocessor 108p-1 selects build key array element 516 from build key array 312-1.

At step 410, coprocessor 108p-1 determines whether one or more spillover criteria is satisfied. At this point in the illustration, at step 410, it is determined that spillover criteria are satisfied. Thus, coprocessor 108p-1 proceeds to step 430, where the spillover of hash table 530 begins.

Spillover of Hash Table

At step 430, coprocessor 108p-1 generates spillover data structures in volatile memory 104. The spillover hash table data structures generated are illustrated by FIG. 6A. Referring to FIG. 6A, hash table 530 includes spillover hash bucket array 640 and spillover link array segment 550-2. In an embodiment, hash bucket array 640 contains the hash bucket elements that each correspond to a hash bucket element in hash bucket array 540. Like each hash bucket element in hash bucket array 540, each hash bucket element of hash bucket array 640 corresponds to a hash value which is calculated using the hash function used for hash bucket array 540, the hash value being the same as associated with the corresponding hash bucket element in hash bucket array 540. For example, the first hash bucket element in hash bucket array 640 represents the same hash value that is represented by the first hash bucket element in hash bucket array 540. As mentioned before, link array segment 550-2 is a link array segment of link array 550.

At step 440, coprocessor 108p-1 calculates the hash value for build key array element 516 as "0xf504." Then at step 445, coprocessor 108p-1 determines that hash bucket element 644 is assigned the hash value "0xf504".

At 450, coprocessor 108p-1 copies the existing offset value stored in hash bucket element 644, if any, to the link array element, in link array 550, that corresponds to the aligned index position of the selected element 510. In the current illustration, hash bucket element 644 does not have an existing offset value or the existing offset value is set to zero. Thus, coprocessor 108p-1 sets link array element 655 to 0 and may omit the step of copying the offset value from the hash bucket element 644 to the link array element 655.

Coprocessor 108p-1 also inserts an offset value calculated for the selected build key array element into the particular hash bucket element that is assigned the matching hash value. In the current illustration, coprocessor 108p-1 inserts the offset value of 9 into hash bucket element 644. Coprocessor 108p-1 then proceeds to step 435.

At step 435, coprocessor 108p-1 selects the next build key array element from build key array 312-1, which in the current example is build key array element 618.

At step 440, coprocessor 108p-1 calculates a hash value for the selected build key array element 605, which is "0xf303".

At step 445, coprocessor 108p-1 determines the particular hash bucket element, in hash bucket array 640, that corresponds to the calculated hash value for build key array element 618, which is hash bucket element 646.

At step 450, coprocessor 108p-1 inserts the offset value for build key array element 618, which is 10, into the hash bucket element 646. Because there is no existing offset value in hash bucket element 646, the link array element 656, which is also identified by the offset value 10 for build key array element 618, is set to zero.

Coprocessor 108p-1 then returns to step 435, processing the next build key array elements, including selecting build key array element 620. After coprocessor 108p-1 selects the build key array element 620 at 435, at step 440, coprocessor 108p-1 calculates a hash value for the selected build key array element 620, which is "0xf504".

At step 445, coprocessor 108p-1 determines the particular hash bucket element, in hash bucket array 640, that corresponds to the calculated hash value for build key array element 618, which is hash bucket element 644.

At step 450, coprocessor 108p-1 copies the existing offset value stored in hash bucket element 644, which is 9, to link array element 657 (see FIG. 6B), that corresponds to the aligned index position of the selected build key array element 620. Coprocessor 108p-1 inserts the offset value for build key array element 620, which is 12, into the hash bucket element 644 (see FIG. 6). Because there is an existing offset value in hash bucket element 644, which is 9, the link array element 656, which is also identified by the offset value 12 for build key array element 618, is set to 9.

As a result of spillover, a hash bucket in hash table 530 may have a "in-cache chain", a "spillover chain", or both. For example, referring to FIG. 6B, hash bucket element 544 and hash bucket element 644 correspond to the same hash bucket, which has an in-cache chain and a spillover chain. The in-cache chain corresponds to hash bucket element 544 and includes the build key array elements identified by hash bucket element 544 and link array element 562 (see FIG. 6B), which are build key array element 514 and build key array element 518, respectively. The spillover chain corresponds to hash bucket element 644 and includes the build key array elements identified by hash bucket element 644 and link array element 657 (see FIG. 5C), which are build key array element 620 and build key array element 516, respectively.

Probe Phase

Figure 7:
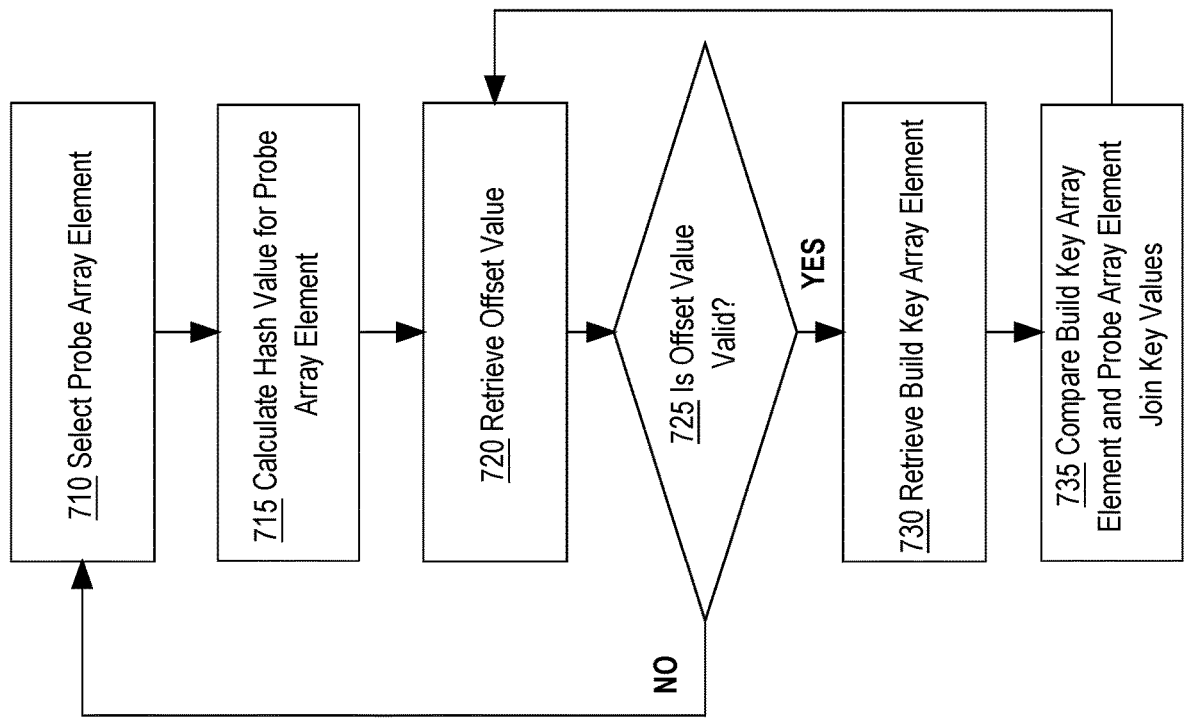
FIG. 7 depicts an example flowchart for comparing join key values from a probe table to rows in a table loaded into hash tables.

Referring back to FIG. 2, at step 230 coprocessor 108p-1 performs the probe phase for a partition. FIG. 7 is a flowchart depicting a procedure for probing hash table 530. The procedure involves performing a series steps in multiple iterations of a loop.

In addition, the procedure is performed once in each of two phases, referred to herein as the in-cache probe phase and the spillover probe phase. In the in-cache probe phase, the in-cache chains are compared to probe element values in the probe element array. In the spillover probe phase, the spillover chains, if any, are compared with the probe element values in the probe element array. As shall be explained in greater detail, for a join key value in a probe key array element during the in-cache probe phase, the join key values in the build key elements in an in-cache chain are compared to the join key values to find join key values that satisfy a join condition. In the spillover phase, join key values build key elements in a spillover chain are compared to the join key value for the probe key array element to find join key values that satisfy a join condition.

The procedure shown in FIG. 7 is performed twice: once in the in-cache phase using in-cache chains represented by in-cache hash bucket array 540 and link array segment 550-1, and once in the spillover phase using hash bucket array 640 and link array segment 550-2.

In-Cache Probe Phase

At step 710, coprocessor 108p-1 selects a probe key array element from the probe key array 314-1. In an initial iteration, coprocessor 108p-1 starts with the first probe key array element at the first index.

At step 715, coprocessor 108p-1 calculates a hash value for the selected probe key array element value. Coprocessor 108p-1 calculates the hash value for the selected probe key array element as "0xf001."

At step 720, coprocessor 108p-1 retrieves the current offset value from the hash bucket array 540. In an embodiment, if coprocessor 108p-1 is retrieving the current offset value using the calculated hash value from step 715, then coprocessor 108p-1 accesses the specific hash bucket element from the hash bucket array based on the calculated hash value. Referring to FIG. 5C, as an example, coprocessor 108p-1 uses the calculated hash value "0xf001" to access hash bucket element 542. Hash bucket element 542 contains offset value "7", which coprocessor 108p-1 retrieves as the current offset value.

In an embodiment, if coprocessor 108p-1 is retrieving an offset value using a previously received offset value, then coprocessor 108p-1 accesses the link array and identifies the specific link array element by deriving the location of the specific link array element from the previously received offset value. For instance, if the previously received offset value is "7", then coprocessor 108p-1 derives the location of the specific link array element as offset value−1 (7−1=7), where "6" is the index location value for the specific link array element.

At step 725, coprocessor 108p-1 determines whether the current offset value is valid by determining whether the current offset value refers to a specific build key array element in build key array 312-1. In an embodiment, coprocessor 108p-1 determines whether the current offset value refers to a specific element by deriving an index value from the current offset value. As described in the build phase, an embodiment of the current offset value includes calculating the offset value as index value+1. Therefore, the index value may be derived as the current offset value−1. For example, if the current offset value retrieved at step 720 is "0", then coprocessor 108p-1 would derive the index value as (0−1), which equals "−1." Since "−1" does not represent a location of a valid build key array element in the build key array, the current offset value would not be valid. In an embodiment, if coprocessor 108p-1 determines that the current index value is not valid, then coprocessor 108p-1 proceeds to step 710 to select a new probe key array element from the probe key array 314-1.

In an embodiment, if at step 725 coprocessor 108p-1 determines that the current offset value is valid, then coprocessor 108p-1 retrieves a specific build key array element. Referring to FIG. 5C as an example, if the current offset value retrieved from hash bucket element 542 (step 720) is "7", then coprocessor 108p-1 would derive the index value as (7−1), which equals "6." Since index value 7 is a valid index value that refers to a valid location of a specific build key array element, coprocessor 108p-1 proceeds to step 730.

At step 730, coprocessor 108p-1 retrieves the specific build key array element at the index position from the build key array. Referring to the FIG. 5C example, coprocessor 108p-1 would locate element 512, which is located at build key array index position 6.

At step 735, coprocessor 108p-1 compares join key values the specific build key array element and the probe key array element to determine whether the values satisfy the join condition. If the values of the elements satisfy the join condition, then the elements are added to the result set of the join condition.

The link array 550 may be made up of link array elements that contain offset values to one or more additional member build key array elements that may belong to the chain of build key array elements associated with a particular hash value. Link array elements are linked together by containing an offset value that may be used to locate a particular member build key array element and to locate the next link array element that may contain the next member build key array element for the set of build key array elements. After comparing the specific build key array element to the probe key array element at step 725, coprocessor 108p-1 proceeds to step 720 to determine whether there are additional build key array elements to be compared to the probe key array element.

At step 720, coprocessor 108p-1 retrieves a new offset value from the link array 550 using the current offset value. Using the FIG. 5C example, offset value "7" was previously used in steps 730 and 735 to compare element 512 to the probe key array element. Coprocessor 108p-1 retrieves a new offset value from the link array 550 by deriving the index value for the link array 550 by subtracting 1 from the current offset value (7−1), which equals 6. Coprocessor 108p-1 then accesses link array element 560, which is at index value position 6, to retrieve new offset value "1."

At step 725, coprocessor 108p-1 determines whether new offset value "1" is valid by determining whether the current offset value refers to a specific element in the build key array 312-1. As discussed, coprocessor 108p-1 determines the validity of the new offset value by deriving the index value as (1−1), which equals 0. Since 0 points to existing element 510, the offset value is valid, and coprocessor 108p-1 proceeds to step 730. If however, the new offset value was 0 or any other invalid offset value, coprocessor 108p-1 would return to step 710 to evaluate another probe key array element. This occurs when coprocessor 108*p*-1 determines that there is no other member build key array elements in the set of build key array elements that match the hash value associated with the current build key array element.

As discussed previously, at steps 730 and 735, coprocessor 108*p*-1 retrieves the build key array element and compares it and the probe key array element to determine whether the values satisfy the join condition. Using the FIG. 5C example, at step 730 coprocessor 108*p*-1 retrieves element 510 from the build key array 312-1 using the build key array index value of 0. At step 735, coprocessor 108*p*-1 compares the values in element 510 to the values within the probe key array element, and if they satisfy the join condition the element 510 and the selected probe key array element are added to a result set.

After completing step 735 for the current offset value of 1, coprocessor 108*p*-1 returns to step 720 to retrieve the next offset value. In FIG. 5C, coprocessor 108*p*-1 retrieves the next offset value from link array 550 at index value position 0, where index value position is calculated from the current offset value (1−1). The next offset value is retrieved from link array element 555 is 0. At step 725, coprocessor 108*p*-1 determines whether offset value 0 is valid by deriving the index value (offset value−1). In this case, the index value is calculated as (0−1) "−1." Since "−1" is not a valid index value, there are no more build key array elements matching the current hash value and then coprocessor 108*p*-1 proceeds to step 710 to select a new probe key array element from the probe key array 314-1.

In an embodiment, the steps of 710-735 are repeated for each probe key array element in the probe key array 314-1 in order to compile a result set of values from the partition.

Spillover Probe Phase

The spillover probe may not be undertaken if there has been no spillover. Thus, before execution of the spillover phase, it is determined whether spillover data structures of hash table 530 have been created or if the spillover has otherwise occurred. If so, then the spillover is commenced as illustrated below.

At step 710, coprocessor 108*p*-1 selects a probe key array element from the probe key array 314-1. In an initial iteration, coprocessor 108*p*-1 starts with the first probe key array element at index position 0.

At step 715, coprocessor 108*p*-1 calculates a hash value for the selected probe key array element value. Coprocessor 108*p*-1 calculates the hash value for the selected probe key array element as "0xf504."

At step 720, coprocessor 108*p*-1 retrieves the current offset value from the hash bucket array 540. In an embodiment, if coprocessor 108*p*-1 is retrieving the current offset value using the calculated hash value from step 715, then coprocessor 108*p*-1 accesses the specific hash bucket element from the hash bucket array based on the calculated hash value. Coprocessor 108*p*-1 uses the calculated hash value "0xf504" to access hash bucket element 644. Hash bucket element 644 contains offset value "12", which coprocessor 108*p*-1 retrieves as the current offset value.

At step 725, coprocessor 108*p*-1 determines whether the current offset value is valid. In response, coprocessor 108*p*-1 retrieves build key array element 620, which is at index position 11.

At step 730, coprocessor 108*p*-1 retrieves the build key array element 620.

At step 735, coprocessor 108*p*-1 compares the join key value in build key array element 620 and the probe key array element to determine whether the values satisfy the join condition. If these join key values satisfy the join condition, then the elements are added to the result set of the join condition.

At step 720, coprocessor 108*p*-1 retrieves a new offset value from the spillover link array segment 550-2 using the current offset value. The offset value "12" was previously used in steps 730 and 735 to compare element 620 to the probe key array element. Coprocessor 108*p*-1 retrieves a new offset value from the link array 550 by deriving the index value for the link array 550 by subtracting 1 from the current offset value (12−1), which equals 11. Coprocessor 108*p*-1 then accesses link array element 657 in link array segment 550-2, which is at index value position 11, to retrieve new offset value "9."

At step 725, coprocessor 108*p*-1 determines whether new offset value "9" is valid.

Similar to as discussed previously, at steps 730 and 735, coprocessor 108*p*-1 retrieves the build key array element 516 and compares it and the probe key array element to determine whether the join key values therein satisfy the join condition. If the join key values satisfy the join condition, then element 516 and the selected probe key array element are added to a result set.

After completing step 735 for the current offset value of 9, coprocessor 108*p*-1 returns to step 720 to retrieve the next offset value. In FIG. 5C, coprocessor 108*p*-1 retrieves the next offset value from link array 550 at index value position 8, where index position is calculated from the current offset value (9−1). The next offset value is retrieved from link array element 655, which is 0.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
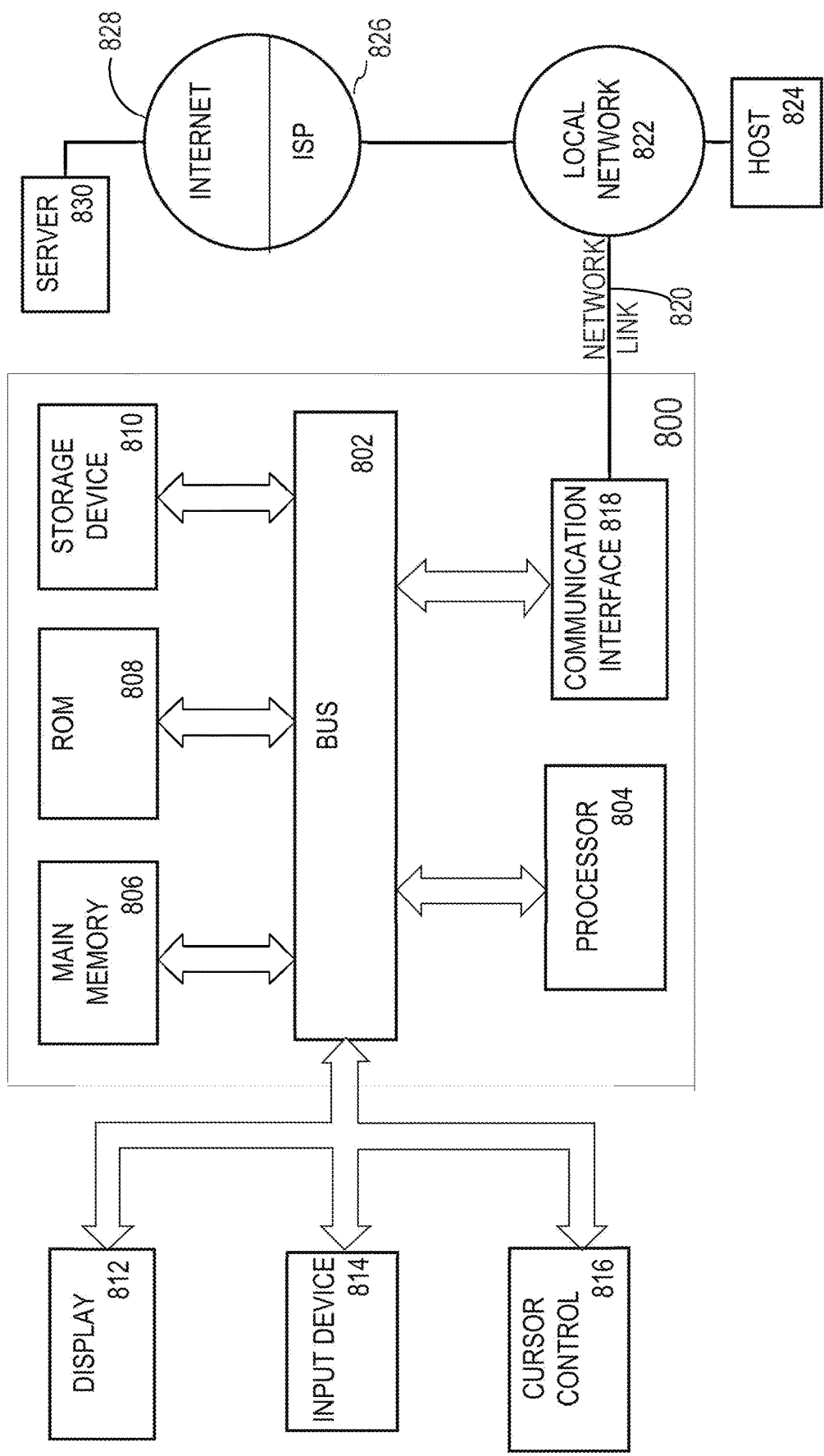
FIG. 8 is a block diagram illustrating a computer system that may be used to implement the techniques described herein.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 9:
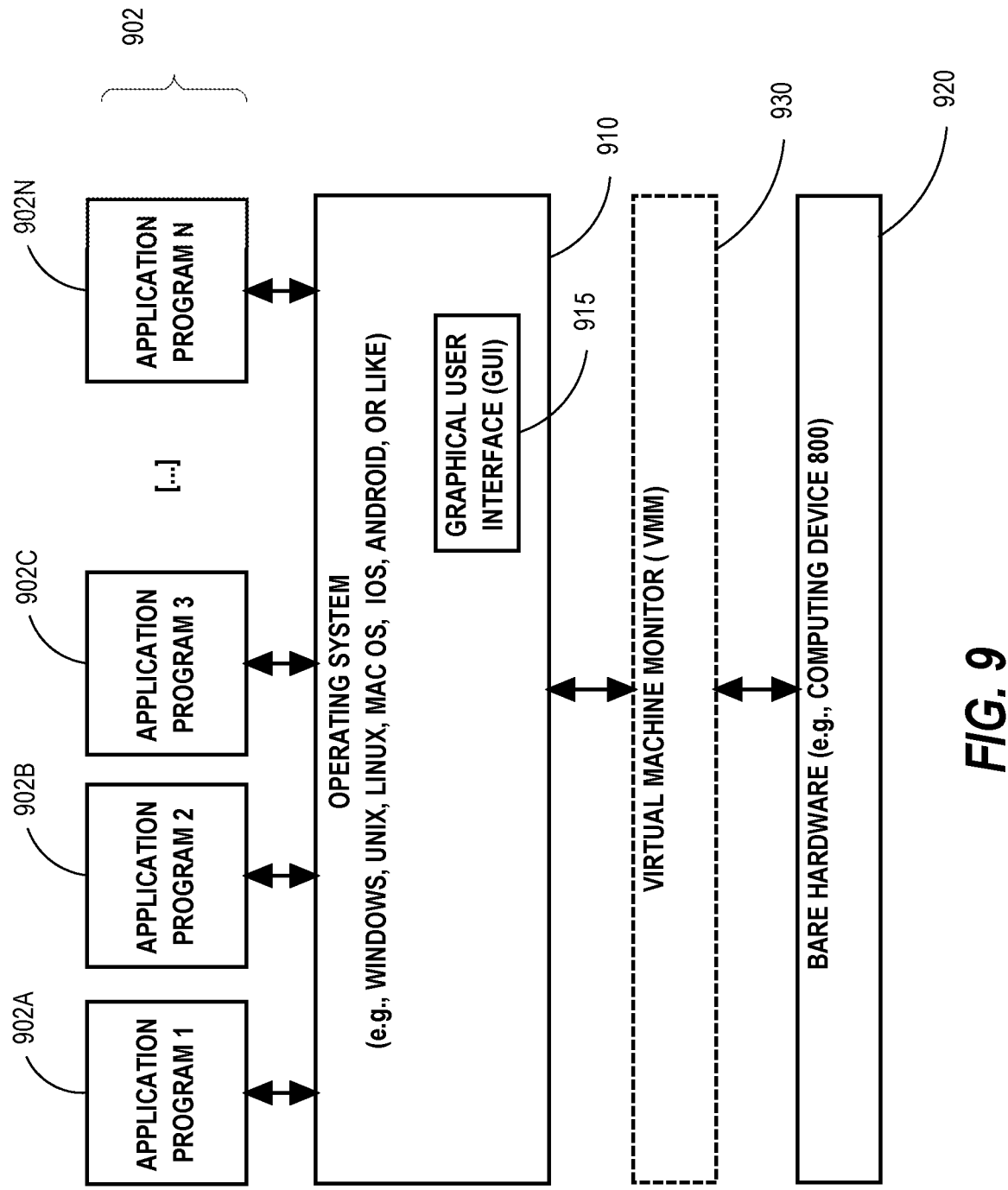
FIG. 9 is a block diagram illustrating a computer software system that may be used to implement the techniques described herein.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
in a local cache comprising scratchpad memory, generating at least a portion of a hash table comprising:
a build key array comprising build key array elements;
an in-cache hash bucket array comprising in-cache hash bucket elements, each in-cache hash bucket element of the in-cache hash bucket elements corresponding to a hash bucket of said hash table;
wherein each in-cache hash bucket element of the in-cache hash bucket elements includes a respective offset value that identifies a respective build key array element of the build key array that is a member of the hash bucket corresponding to said each in-cache hash bucket element;
an in-cache link array segment of a link array, said link array being index aligned with said build key array;
for a first build key array element of the build key array, determining that a particular in-cache hash bucket element from the in-cache hash bucket array corresponds to the first build key array element based upon a calculated hash value for the first build key array element;
copying an offset value stored in the particular in-cache hash bucket element to a first particular link array element in said in-cache link array segment that is at the same index position of said first build key array element;
inserting an offset value identifying said first build key array element into said particular in-cache hash bucket element;
in response to determining that one or more spillover criteria are satisfied:
in memory different than said scratchpad memory, generating at least a portion of said hash table comprising:
a spillover hash bucket array comprising spillover hash bucket elements, each spillover hash bucket element of the spillover hash bucket elements corresponding to a hash bucket of said hash table;
a spillover link array segment of a link array comprising spillover link array segments;
for a second build key array element of the build key array, determining that a particular spillover hash bucket element from the spillover hash bucket array corresponds to said second build key array element based upon a calculated hash value for said second build key array element; and
inserting an offset value identifying said second build key array element into said particular spillover hash bucket element.

2. The method of claim 1, further comprising:
for a third build key array element of the build key array, determining that said particular spillover hash bucket element from the spillover hash bucket array corresponds to the third build key array element based upon a calculated hash value for the third build key array element;
copying the offset value identifying said second build key array element stored in said particular spillover hash bucket element to a third particular link array element in said spillover link array segment that is at the same index position of said third build key array element;
inserting an offset value identifying said third build key array element into said particular spillover hash bucket element.

3. The method of claim 2, further comprising:
for a fourth build key array element of the build key array, determining that said particular in-cache hash bucket element from the in-cache hash bucket array corresponds to the fourth build key array element based upon a calculated hash value for the fourth build key array element;
copying the offset value identifying said first build key array element stored in said particular in-cache hash bucket element to a fourth particular link array element in said in-cache link array segment that is at the same index position of said fourth build key array element;
inserting an offset value identifying said fourth build key array element into said particular in-cache hash bucket element.

4. The method of claim 3, further comprising:
for a particular probe key array element of a probe key array, determining that said particular spillover hash bucket element from the spillover hash bucket array corresponds to said particular probe key array element based upon a calculated hash value for said particular probe key array element;
determining that the offset value in said particular spillover hash bucket element identifies said third build key array element;
determining a join condition of a join operation is satisfied based on a join key value in said third build key array element and a join key value in said particular probe key array element; and
in response to determining that said join condition of a join operation is satisfied based on said join key value in said third build key array element and said join key value in said particular probe key array element, adding said third build key array element and said particular probe key array element to a result set.

5. The method of claim 4,
wherein said the offset value in said particular spillover hash bucket element identifies a particular spillover link array element in said spillover link array segment that is at the same index position of said third build key array element;
wherein said particular spillover link array element holds an offset value that identifies another spillover link array element of said spillover link array segment; and
wherein the method further comprises determining that said join condition is satisfied based on a join key value in another spillover link array element and the join key value in said particular probe key array element.

6. The method of claim 5, further comprising:
for said particular probe key array element, determining that said particular in-cache hash bucket element from the in-cache hash bucket array corresponds to said particular probe key array element based upon said calculated hash value for said particular probe key array element;
determining that the offset value in said particular in-cache hash bucket element identifies another build key array element;
determining said join condition of said join operation is satisfied based on a join key value in said another build key array element and said join key value in said particular probe key array element; and
in response to determining that said join condition of said join operation is satisfied based on a join key value in said another build key array element and said join key value in said particular probe key array element, adding said another build key array element and said particular probe key array element to a result set.

7. The method of claim 6,
wherein said the offset value in said particular in-cache hash bucket element identifies a particular in-cache link array element in said in-cache link array segment that is at the same index position of said another build key array element;
wherein said particular in-cache link array element holds an offset value that identifies certain build key array element of said build key array; and
wherein the method further comprises determining that said join condition is satisfied based on a join key value in said certain build key array element and the join key value in said particular probe key array element.

8. The method of claim 1, wherein the particular spillover hash bucket element and the particular in-cache hash bucket element correspond to a same hash bucket of said hash table.

9. The method of claim 1, wherein said memory different than said scratchpad memory has higher latency memory than said scratchpad memory.

10. The method of claim 4, wherein said build key array holds column values from a build table and said probe key array holds column values from a probe table.

11. One or more non-transitory computer-readable media storing sequences of one or more instructions which, when executed by one or more processors, cause:
in a local cache comprising scratchpad memory, generating at least a portion of a hash table comprising:
a build key array comprising build key array elements;
an in-cache hash bucket array comprising in-cache hash bucket elements, each in-cache hash bucket element of the in-cache hash bucket elements corresponding to a hash bucket of said hash table;
wherein each in-cache hash bucket element of the in-cache hash bucket elements includes a respective offset value that identifies a respective build key array element of the build key array that is a member of the hash bucket corresponding to said each in-cache hash bucket element;
an in-cache link array segment of a link array, said link array being index aligned with said build key array;
for a first build key array element of the build key array, determining that a particular in-cache hash bucket element from the in-cache hash bucket array corresponds to the first build key array element based upon a calculated hash value for the first build key array element;
copying an offset value stored in the particular in-cache hash bucket element to a first particular link array element in said in-cache link array segment that is at the same index position of said first build key array element;
inserting an offset value identifying said first build key array element into said particular in-cache hash bucket element;
in response to determining that one or more spillover criteria are satisfied:
in memory different than said scratchpad memory, generating at least a portion of said hash table comprising:
a spillover hash bucket array comprising spillover hash bucket elements, each spillover hash bucket element of the spillover hash bucket elements corresponding to a hash bucket of said hash table;
a spillover link array segment of a link array comprising spillover link array segments;
for a second build key array element of the build key array, determining that a particular spillover hash bucket element from the spillover hash bucket array corresponds to said second build key array element based upon a calculated hash value for said second build key array element; and
inserting an offset value identifying said second build key array element into said particular spillover hash bucket element.

12. The one or more non-transitory computer-readable media of claim 11, wherein the sequences of one or more instructions include instructions that, when executed by said one or more processors, cause:
for a third build key array element of the build key array, determining that said particular spillover hash bucket element from the spillover hash bucket array corresponds to the third build key array element based upon a calculated hash value for the third build key array element;
copying the offset value identifying said second build key array element stored in said particular spillover hash bucket element to a third particular link array element in said spillover link array segment that is at the same index position of said third build key array element;
inserting an offset value identifying said third build key array element into said particular spillover hash bucket element.

13. The one or more non-transitory computer-readable media of claim 12, wherein the sequences of one or more instructions include instructions that, when executed by said one or more processors, cause:
for a fourth build key array element of the build key array, determining that said particular in-cache hash bucket element from the in-cache hash bucket array corresponds to the fourth build key array element based upon a calculated hash value for the fourth build key array element;
copying the offset value identifying said first build key array element stored in said particular in-cache hash bucket element to a fourth particular link array element in said in-cache link array segment that is at the same index position of said fourth build key array element;
inserting an offset value identifying said fourth build key array element into said particular in-cache hash bucket element.

14. The one or more non-transitory computer-readable media of claim 13, wherein the sequences of one or more instructions include instructions that, when executed by said one or more processors, cause:
for a particular probe key array element of a probe key array, determining that said particular spillover hash bucket element from the spillover hash bucket array corresponds to said particular probe key array element based upon a calculated hash value for said particular probe key array element;
determining that the offset value in said particular spillover hash bucket element identifies said third build key array element;
determining a join condition of a join operation is satisfied based on a join key value in said third build key array element and a join key value in said particular probe key array element; and
in response to determining that said join condition of a join operation is satisfied based on said join key value in said third build key array element and said join key value in said particular probe key array element, adding said third build key array element and said particular probe key array element to a result set.

15. The one or more non-transitory computer-readable media of claim 14, wherein said the offset value in said particular spillover hash bucket element identifies a particular spillover link array element in said spillover link array segment that is at the same index position of said third build key array element;

wherein said particular spillover link array element holds an offset value that identifies another spillover link array element of said spillover link array segment; and wherein the sequences of one or more instructions include instructions that, when executed by said one or more processors, cause determining that said join condition is satisfied based on a join key value in another spillover link array element and the join key value in said particular probe key array element.

16. The one or more non-transitory computer-readable media of claim 15, wherein the sequences of one or more instructions include instructions that, when executed by said one or more processors, cause:

for said particular probe key array element, determining that said particular in-cache hash bucket element from the in-cache hash bucket array corresponds to said particular probe key array element based upon said calculated hash value for said particular probe key array element;

determining that the offset value in said particular in-cache hash bucket element identifies another build key array element;

determining said join condition of said join operation is satisfied based on a join key value in said another build key array element and said join key value in said particular probe key array element; and in response to determining that said join condition of said join operation is satisfied based on a join key value in said another build key array element and said join key value in said particular probe key array element, adding said another build key array element and said particular probe key array element to a result set.

17. The one or more non-transitory computer-readable media of claim 16, wherein said the offset value in said particular in-cache hash bucket element identifies a particular in-cache link array element in said in-cache link array segment that is at the same index position of said another build key array element;

wherein said particular in-cache link array element holds an offset value that identifies certain build key array element of said build key array; and wherein the sequences of one or more instructions include instructions that, when executed by said one or more processors, cause determining that said join condition is satisfied based on a join key value in said certain build key array element and the join key value in said particular probe key array element.

18. The one or more non-transitory computer-readable media of claim 11, wherein the particular spillover hash bucket element and the particular in-cache hash bucket element correspond to a same hash bucket of said hash table.

19. The one or more non-transitory computer-readable media of claim 11, wherein said memory different than said scratchpad memory has higher latency memory than said scratchpad memory.

20. The one or more non-transitory computer-readable media of claim 14, wherein said build key array holds column values from a build table and said probe key array holds column values from a probe table.

* * * * *